Figure 1:
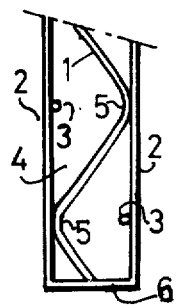

United States Patent [19]

Pielkenrood

[11] 4,054,529
[45] Oct. 18, 1977

[54] DEVICE FOR TREATING A SUSPENSION

[75] Inventor: Jacob Pielkenrood, Krommenie, Netherlands

[73] Assignee: Pulkenrood-Vinitex B.V., Assendelft, Netherlands

[21] Appl. No.: 500,581

[22] Filed: Aug. 26, 1974

[30] Foreign Application Priority Data

Sept. 7, 1973  Netherlands .................. 7312337

[51] Int. Cl.² .............................................. B01D 21/00
[52] U.S. Cl. ................................... 210/521; 55/440
[58] Field of Search ............... 210/521, 522; 55/440; 52/618, 625, 450, 452, 454

[56] References Cited

U.S. PATENT DOCUMENTS

| | | | |
|---|---|---|---|
| 944,592 | 12/1909 | Bonsall | 52/618 |
| 1,109,588 | 9/1914 | Kluge | 55/440 |
| 1,190,863 | 7/1916 | Corne et al. | 210/521 X |
| 1,281,452 | 10/1918 | White | 52/450 |
| 1,795,909 | 3/1931 | Brunt et al. | 55/440 X |
| 1,872,984 | 8/1932 | Land | 52/452 |
| 2,019,186 | 10/1935 | Kaiser | 55/440 |
| 2,595,838 | 5/1952 | Fuglie | 210/521 X |
| 2,926,518 | 3/1960 | Finley et al. | 52/452 |
| 3,616,623 | 11/1971 | Reid | 55/440 |
| 3,672,511 | 6/1972 | Watson et al. | 210/522 |

Primary Examiner—Theodore A. Granger
Attorney, Agent, or Firm—George F. Smyth

[57] ABSTRACT

A cage comprising one or more wire grids for supporting corrugated plates in a device for treating suspensions.

17 Claims, 8 Drawing Figures

DEVICE FOR TREATING A SUSPENSION

In the prior patent application Ser. No. 353,543 a device for causing coalescence of particles suspended in a carrier liquid has been described, in which the carrier liquid with suspended particles to be separated therefrom is led through substantially vertically extending passages between substantially parallel walls, which walls will cause therein by friction with the liquid a transverse velocity gradient so that the particles can overtake one another, which leads to an increase of the chance of coalescence between such particles. These walls are, in particular, corrugated plates, the generatrices of the corrugations of these plates being directed transversely to the flow direction, i.e. substantially horizontally. If desired alternating corrugated plates can be made slidable in the flow direction so as to allow the phase relationship between the corrugations of adjacent plates to be varied, which has an influence on the velocity gradient in the flow.

In the prior patent application Ser. No. 112,620 separating devices have been described in which a carrier liquid with suspended particles to be separated therefrom is led through passages between parallel corrugated plates which are positioned at a slope in respect of the horizontal plane, the flow direction either including an angle with, and in particular being directed perpendicularly to the direction of the generatrices of the corrugations, or being directed in the direction of these generatrices, this in such a manner that the particles separated from the liquid are collected in the valleys or the crests of these corrugations, and can be removed along the slope of these plates towards collecting spaces.

In such devices it is very important that the corrugated plates remain at the same distance in all points. In the case of flows transversely to the corrugations the danger exists that vibrations are generated in the plates. Since corrugated plates have a high rigidity in one direction, it is, for supporting such plates, generally sufficient to support the plates at their extremities in the crests and/or valleys or half-way between the crests and the valleys, or to provide supporting buttons thereon. Such a support is, however, insufficient for suppressing vibrations, and, in the case of mutually slidable corrugated plates, such a support is not possible, or only possible when using complicated auxiliary means.

It is an object of the invention to provide a support for corrugated plates for similar purposes not having these draw-backs, and, moreover, enabling a very simple and efficient support of such plates in all circumstances.

According to the invention use is made of a cage adapted to enclose each plate or a set of aligned plates, which cage comprises at least one substantially plane grid consisting of a first set of parallel rods made of a rigid material, which are interconnected by means of a second set of transversely directed rods to form a rigid unit, which grids are adapted to be positioned in a basis parallel to similar grids and at definite distances therefrom. In particular each cage comprises two parallel grids which are interconnected by means of transverse rods, the rods of one set of each grid being transversely directed to the generatrices of the corrugations of a corrugated plate disposed between said grids, said rods then contacting the crests of the corrugations directed towards the grid in question.

Such cages can be constructed in various ways, and can, in particular, be adapted to support alternating plates slidably in respect of the intermediate plates.

Figure 2:
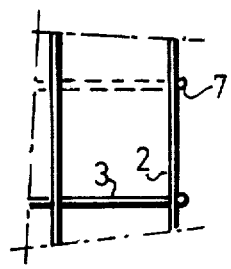
Figure 3A:
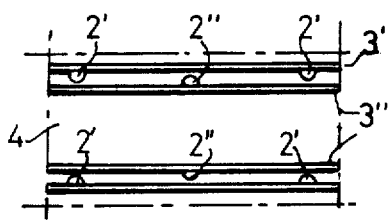
Figure 4:
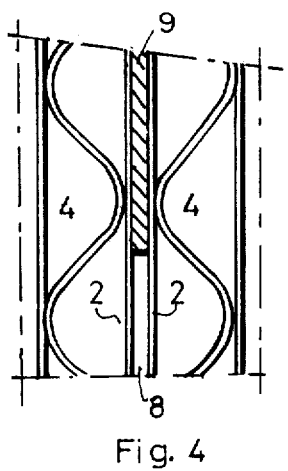
Figure 5:
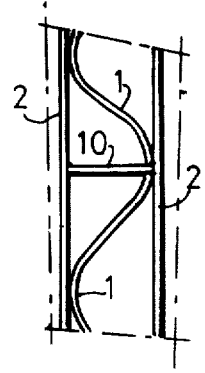

The invention will be elucidated below by reference to a drawing, showing in:

FIGS. 1 and 2 partial views of a cage according to the invention;

FIGS. 3A, B and C partial views of a plural cage according to the invention;

FIG. 4 a partial view of a plural cage with a plane auxxiliary plate;

FIG. 5 a partial view of a subdivided cage; and

Figure 6:
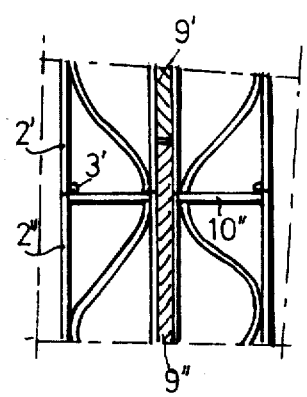

FIG. 6 a partial view of a cage divided into separate parts.

In FIGS. 1 and 2 the basic structure of a cage according to the invention for supporting a corrugated plate 1 is schematically shown. This cage consists of two parallel grids, each consisting of rods 2 and 3 crossing each other substantially perpendicularly and being interconnected in the crossing points, which grids define a compartment 4. The rods 2 are directed transversely to the generatrices of the corrugations of plate 1 disposed in the compartment 4, and are contacting the crests 5 of these corrugations. The connections between the rods 2 and 3 are, for instance, welding connections. The rods 3 are positioned in such a manner that they do not impede the contact between the crests 5 and the rods 2 as clearly appears from FIG. 1.

The rods 2 of both grids are interconnected at least at one extremity by means of transverse rods 6. To that end any two rods 2 of both grids and a transverse rod 6 can consist of a single U-shaped rod. It is also possible to bend the rods 2 of both grids from one single rod, in which case any two adjacent rods of a grid are interconnected at one extremity by a part which is directed parallel to the rods 3.

After inserting the corrugated plate 1, transverse rods 6 can be provided also at the other extremity. It is also possible to weld transverse rods 7 at the lateral sides to the extremities of the rods 3 or to the rods 2 connected to said extremities.

Such cages can be arranged side by side in a basin, so that always the grids of adjacent cages will contact one another, the corresponding dimension of the basin being equal to the total width of these cages so that the whole assembly closely fits in said basin without rattling. It is advisable to position the rods 2 of the grids in the manner shown in FIG. 3A. The rods of one cage are indicated at 2′, and those of the next one at 2″. These rods are, then, contacting the crests 5 of the plate in the compartment 4′ of the first cage as well as those of the plate in the compartment 4″ of the adjacent cage. This can be realized in a simple manner by making the distance of the first rod of a grid to the adjacent edge of this grid smaller than the distance of the last rod of this grid to the opposing edge, so that, on rotating alternating cages, the desired position of the rods 2 will be obtained.

In practice, however, it is preferred not to use separate cages to be juxtaposed, but a simple composite cage or a small number of such cages, each cage comprising the desired number of compartments 4, each compartment being separated from an adjacent one by a single grid consisting of rods 2 and 3. The rods of the different grids of such a cage can, again, be obtained by plurally bending a single rod.

Figure 3B:
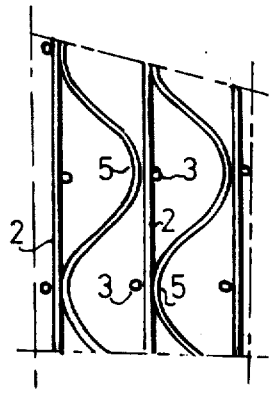
Figure 3C:
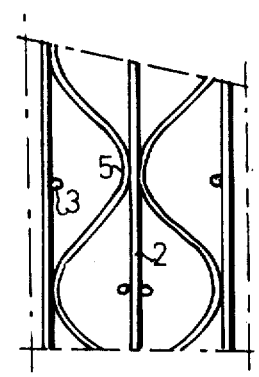

FIG. 3B and 3C show two possible positions of the plate 1 in adjacent compartments 4. The arrangement shown is intended for a coalescence apparatus according to patent application Ser. No. 353,543, in which a liquid flow with suspended particles is led vertically upwards or downwards between the plates 1. In the case of FIG. 3B in which the plate corrugations are all in phase, mainly the transverse velocity gradient caused by friction against the plates will be utilised for the coalescence, increased by some additional velocity differences caused by the alternating deflections of the flow by the curves of these plates. In the arrangement of FIG. 3C, however, the passage is alternately widened and narrowed, which leads to another flow configuration with velocity gradients directed substantially in the flow direction. The flow resistance, is, in this case, higher than in the case of FIG. 3B.

It is now possible to obtain a gradual transition between the adjustment of FIGS. 3B and 3C if a plurality of cages of FIG. 1 with rods 2' is interconnected with such a distance between adjacent cages that exactly one separate cage is fitting in each interspace, the rods 2' of which fit, in the manner shown in FIG. 3A, between the rods 2" of the adjacent fixed cages, the former rods then abutting the crests 5 of the plates 1 disposed in said adjacent cages, and, on the other hand, the rods 2' of these adjacent cages abut the crests 5 of the plate in the intermediate cage. By making these intermediate cages displaceable through at least half a wave-length of the corrugations of the plates 1, a transition from the adjustment of FIG. 3B to that of FIG. 3C can be obtained. It will be clear that these movable cages can be united into a jointly displaceable unit which is substantially equal to the unit formed by the fixed cages but which is inversely positioned.

FIG. 4 shows another embodiment in which, between two cages with compartments 4, a narrower interspace 8 is situated in which a plane plate 9 is fitting which remains at a distance from the crests 5 of the corrugated plates 1 disposed in said compartments 4, which distance is determined by the thickness of the rods 2. This plate narrows the passage between two facing crests 5, and thus increases the flow resistance, and at the same time the velocity gradient in the longitudinal direction is increased, as the ratio between the cross-sections of the wider and narrower parts is increased. If, as shown, the plate 9 extends only along a part of the corrugations, the resistance will, of course, be lower than in the case of a plate extending along all the corrugations. In this manner an adjustment of the configuration of the velocity gradient can be obtained. Evidently the plate 9 can be made slidable so as to obtain a variable adjustment.

In FIG. 4 the adjacent plates 1 are shown in phase opposition. Also if the plates are in phase a narrowing of the passage will be obtained between a curve thereof and the intermediate plane plate 9, which will lead to a modification of the flow configuration.

The corrugated plates used for these purposes have, in the wave direction, i.e. transversely to the generatrices of the corrugations, a fixed length, which, therefore, comprises a definite number of wavelengths. Although it is possible to weld together such plates so that a continuous wave is obtained. It is simpler to subdivide the cage compartments 4 in the manner shown in FIG. 5 into partial compartments by means of intermediate rods 10, which are, for instance, welded to the rods 2 or 3, each partial compartment having, in the direction in question, the dimension of a standard width of the corrugated plate. In this manner it is possible to join such plates without a phase difference. If required these plates are provided with recesses fitting around the transverse rods 10.

It is, of course, also possible to give these cages a dimension corresponding to said standard width, in particular in the case of a plural cage consisting of a plurality of cages juxtaposed with or without an interspace, and a number of such cages can be vertically stacked. The rods can be provided with directing members in order to obtain a correct alignment of the plates. In particular adjacent transverse rods 6 of such cages can be arranged mutually off-set, which rods can bear, for instance, on longitudinal rods 3 at the extremities of adjacent cages.

In the embodiment of FIG. 4 the plane plate 9 can serve as a supporting member on which the transverse rods of a superposed cage can bear. It is also possible, as shown in FIG. 6, to make this plate projecting at one side and not extending, at the opposite side, fully up to the end of the cage so that the projecting part of another plate fits therein.

It will, furthermore, be clear that what has been remarked in respect of FIG. 5 relative to plates with a given standard width, also holds for the case of plates with a standard width in the direction of the generatrices of the corrugations, in which case either the compartments 4 can be subdivided into partial compartments in the direction in question, or individual cages can be juxtaposed in that direction.

The described cages can also be applied in separating devices in which the plates are positioned at an angle, in respect of the horizontal plane, for instance according to patent application Ser. No. 112,620 in the which the generatrices of the corrugations extend between the higher and lower sides of these plates, and the liquid flow is directed transversely thereto (and generally horizontally). It is often desired, in that case, to make the distance between the crests of the plates larger than shown in FIG. 3, and then an arrangement corresponding to FIG. 4 but without the plane intermediate plate 9 can be used. Although in such cases plates with corrugations in phase are generally used, also arrangements with the corrugations in phase opposition or with an intermediate phase relationship can be used, and, if desired, the phase relationship can be made variable.

An advantage of these cages in such separating devices is, again, that a distributed support is obtained so that additional supporting members which often reduce the flow cross-section become superfluous, and vibrations in the plates at certain flow velocities are prevented.

Also in plate separators in which the flow is directed parallel to the generatrices of the corrugations such cages can be used. If, as is often the case, plates with rather deep corrugations are used, in which the crests of a plate extend into the intermediate spaces between the crests of an adjacent plate (cfr., for example, the prior U.S. Pat. No. 3,666,111), transverse rods contacting these crests and directed transversely to the corrugations cannot be used. Instead thereof, for instance, only longitudinal rods can be used on which the crests of the plates are suspended, which rods are, at their extremities, connected to suitable transverse supports, and, if necessary, corrugated transverse rods can be provided in intermediate points.

Within the scope of the invention many modifications are possible.

I claim:

1. In a device for promoting the separation of and for separable components suspended in a carrier liquid, wherein said device includes an assembly of substantially parallel similarly profiled plates within a housing surrounding this assembly, which assembly is provided with means for leading the liquid flow to be treated through the interspaces between said plates, and for subsequently discharging said flow therefrom, the improvement comprising means for enclosing each plate in a cage, said cage including at least one substantially plane grid consisting of a first set of parallel rods of a rigid material, said rods being interconnected by means of a second set of transversely directed rods to form a rigid unit, and said housing including a number of such grids positioned at definite mutual distances in said housing.

2. The device of claim 1, wherein said plates are corrugated and wherein there are a plurality of cages, wherein each cage consists of two parallel grids which are interconnected by means of transverse rods, the rods of one of said sets being directed transversely to the generatrices of the corrugations of a corrugated plate disposed between said grids thereby to contact the crests of these corrugations directed towards the grid in question.

3. The device of claim 1 wherein the rods contacting the crests of one set are located so that, on juxtaposing a plurality of cages, these rods are mutually off-set so that the rods of such a set will also contact the crests of a plate inside an adjacent cage, the thickness of the rods corresponding to the desired distance between the crest planes of adjacent plates.

4. The device of claim 2, wherein two adjacent cages have always one grid wall in common.

5. The device of claim 1 wherein the grids of a cage are interconnected at given distances between two extremities by means of additional transverse rods so as to subdivide the compartment of this cage into partial compartments, which distances correspond to standard widths of the plates.

6. The device of claim 1 wherein the cage has the dimensions of a standard width, and wherein two or more cages are juxtaposed in the direction of extension of the plates so that the compartments of these cages will be aligned, the corrugations of the plate disposed in these adjoining compartments then joining without a phase difference.

7. The device of claim 6 wherein any two adjacent cages are mutually separated by an intermediate compartment.

8. The device of claim 7, wherein the intermediate compartment receives a plane plate, the flow direction of the liquid being substantially transverse to the generatrices of the corrugations.

9. The device of claim 6 wherein the transverse rods at the lower side of a cage bear on the end face of the intermediate plate of the underlying cage.

10. The device of claim 8 wherein the intermediate plate slightly projects at one side from the cage, and is slightly retracted at the opposite side, this in such a manner that, when disposing different cages in alignment, the projecting plate portion of one cage fits into the space beyond the plate of an adjacent cage.

11. The device of claim 8, wherein the plane intermediate plate extends, as seen in the flow direction, only through a part of the compartment.

12. The device of claim 7 wherein the intermediate plate is slidable in the flow direction.

13. The device of claim 7 wherein each intermediate compartment is filled with a similar cage which is slidable transversely to the direction of the generatrices.

14. The device of claim 13, wherein each slidable cage is movable through at least the length of one half wavelength of the corrugations, so as to enable movement of the corrugations of the plate in a slidable cage between a position in phase with the adjacent fixed plates, and a position out of phase with adjacent fixed plates.

15. The device of claim 14 wherein the various parallel grids consist of U-shaped bent rods so as to form as well a rod of a set as a transverse rod.

16. The device of claim 1 wherein the device promotes coalescence of suspended particles in a vertical liquid flow, and wherein the grids are directed substantially vertically, and wherein the generatrices of the corrugations of the plates extend substantially horizontally.

17. The device of claim 1 wherein the device is a separation device in which the separated components are collected in the crests and/or valleys of the plates, and wherein the grids are directed at an angle with the horizontal plane.

* * * * *